Sept. 7, 1954  F. R. RUSSELL  2,688,646
TWO-STAGE OLEFINIC POLYMERIZATION PROCESS
Filed July 27, 1950  2 Sheets-Sheet 1

Francis R. Russell Inventor
By W. O. T Heilman Attorney

Patented Sept. 7, 1954

2,688,646

UNITED STATES PATENT OFFICE 2,688,646

TWO-STAGE OLEFINIC POLYMERIZATION PROCESS

Francis R. Russell, Mountainside, N. J., assignor to Standard Oil Development Company, a corporation of Delaware Application July 27, 1950, Serial No. 176,165

7 Claims. (Cl. 260—683.15)

The present invention relates to the polymerization of olefins, and more particularly to the polymerization of normally gaseous olefins to liquid hydrocarbons comprising essentially aliphatic polymers or copolymers suitable for use in the manufacture of motor fuel.

Broadly, the present invention relates to a two stage polymerization of a mixed olefin feed, wherein the hydrocarbons are agitated with a catalyst in a first well-mixed zone wherein most of the olefins are polymerized and wherein the effluent is passed to a second poorly-mixed zone submerged in the first well-mixed zone to complete the polymerization. By submerging the second zone in the first zone excellent heat transfer between the zones is obtained and the heat of reaction of both zones is efficiently utilized.

In a more specific aspect, olefins such as ethylene, propylene and butylene are agitated in the first zone with a catalyst suspended in the reactants at a temperature between 350 and 600° F. and pressures above those required to condense the gases at the critical temperature, i. e. pressures above the critical. The effluent from this zone is contacted with the same or different catalyst in a second zone comprising either a stationary bed or a bed otherwise having relatively little top to bottom mixing and which is immersed in the first zone.

The manner in which the present process is carried out will be fully understood from the following description when read with reference to the accompanying drawings wherein.

Figure 1:
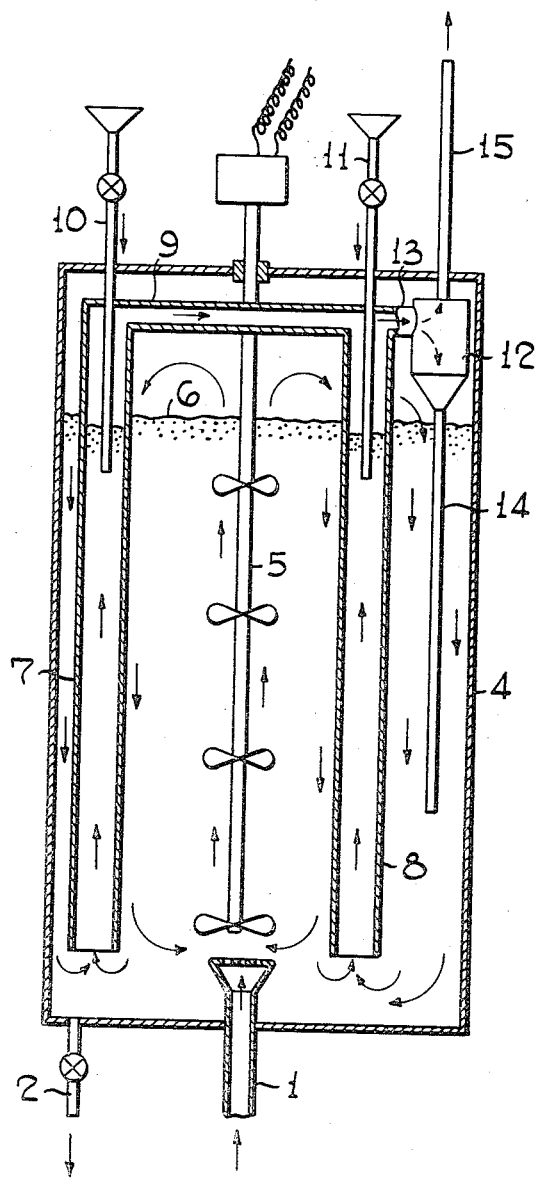
Fig. 1 is a semi-diagrammatic view in sectional elevation of a single reactor provided with space for thoroughly mixing the reactant with the catalyst and immersed therein a zone wherein little or no mixing occurs and wherein total effluent from the well-mixed zone passes to the poorly-mixed zone.

Conventional polymerization processes utilize a moderately active catalyst in a fixed bed operation. The catalyst is packed inside long tubes around which a cooling medium circulates. These tubes are normally 2 to 5 inches in diameter. Another type process utilizes large chambers packed with the catalyst. Due to the large amount of heat produced in the polymerization reaction, more or less local overheating occurs in these catalyst beds, whether in tubes or chambers, and much of the catalyst in the bed is therefore deactivated as the process proceeds; usually only a small portion of the catalyst is actually being efficiently utilized at any given time. In the initial stages of the process the initial 20 or 30 per cent of the catalyst is doing the bulk of the polymerization; later this catalyst will become inactive and often fused together so that only the last portions of the catalyst are being used.

In copending application, Serial No. 152,858, filed March 30, 1950, now U. S. Patent No. 2,626,290, in the name of William K. Fell and John D. Leslie, it has been suggested that this difficulty might be overcome by utilizing a fluidized solid or slurry type separation with finely divided catalyst suspended in or slurried in the fluid reactants, at pressures above the critical. Good mixing is generally a criterion of a succsessful fluid or slurry operation with the result that composition and temperature throughout the reaction zone are quite uniform. Under these conditions, a fair olefin concentration would of necessity exist throughout the reactor, possibly as much as 5 to 10 per cent. If much lower olefin concentration were used, the rate of reaction would suffer and a much larger reaction zone or vessel would be required. On the other hand, an appreciable olefin concentration means that the fluid leaving the reactant zone will contain appreciable unreacted olefin, thus resulting in a low conversion for the process. With a well fluidized bed, then, it will be difficult or expensive to attain high conversions. Due to the high heat transfer coefficient realized in such a fluid or slurry operation, the cooling surface required can be relatively small and can be further minimized by introducing the reactants cold so that the heat of reaction can be used to supply the sensible heat of the incoming feed. Thus, a fluid or slurry operation offers several advantages over the fixed bed operation but has the one disadvantage that serious loss of unreacted olefin would usually result.

To overcome this disadvantage of the fluid or slurry process, it has been proposed in copending application, Serial No. 152,825, now U. S. Patent No. 2,626,290, filed March 30, 1950, in the name of Francis R. Russell, to maintain two reaction zones, one a well fluidized, well mixed zone of the fluid or slurry operation, followed by a zone in which top to bottom mixing is relatively poor or non-existent for cleaning up the olefin remaining in the products from the well mixed zone. This may be a second fluid bed with little or no top to bottom mixing or a fixed bed catalyst of the usual type of pills or lumps packed in tubes passing through it. In this way the material in the fluid bed could be maintained at a sufficiently high olefin concentration to establish good reaction rates and yet the products leaving the fixed bed zone would be relatively low in olefin concentration and therefore represent a high overall conversion for the process.

In any case, however, the second zone has been placed either in the same vessel above the first zone or in a separate zone. Such an arrangement requires additional heat exchange equipment for the second zone due to the fact that there is little end-to-end mixing in this zone. In some cases conversion rates in the second zone become material and the factor of heat exchange becomes important. This results in an increase in heat exchange equipment which is both costly, bulky and sometimes inefficient.

The present invention proposes to overcome the disadvantages sometimes realized in the two-stage processes described in the copending application by immersing the second or poorly-mixed zone in the slurry bed of the first or well-mixed zone. The whole feed is introduced near the bottom of the fluid or slurry bed of catalyst. The reaction in this bed occurs in a well mixed zone in which heat transfer is rapid and which is uniform in temperature throughout at the optimum reaction temperature. The feed is introduced cold or nearly cold inasmuch as the heat of reaction will serve to instantly preheat the feed as soon as it is mixed into the slurry. The material leaving this zone must leave through a small diameter tube (or baffled tubes of somewhat larger diameter) immersed in the larger zone and in which a definite interface level can exist if desired. Sufficient catalyst is charged to the reactor so that the level in the poorly mixed zone will be sufficiently high to clean up most of the olefin leaving the well-mixed zone so that little olefin goes out with the products. At the same time considerable polymerization occurs in the poorly mixed zone without appreciable overheating or temperature rise since it is in excellent contact with the slurry in the well mixed zone. Such a zone has excellent heat transfer coefficients and therefore can easily exchange the heat from the poorly mixed zone to the well-mixed zone and thereby utilize all the heat of reaction to preheat the feed. Little or no provision for cooling coils or water cooled tubes is required in the small diameter reactor. Little, if any, cooling will be required even in the well-mixed zone if the feed is introduced cold. The exact heat balance will, of course, depend upon the feed composition and the overall conversion achieved but the apparatus of the present invention enables all of the heat of reaction to be utilized and permits good olefin cleanup at high conversions in the equivalent of a fixed or poorly mixed bed without the attendant heat transfer difficulties of such a fixed bed or poorly mixed zone. Obviously mechanical stirring could be used in these zones also if desired but it should not be sufficiently turbulent to prevent an olefin concentration gradient from the entrance to the exit of the poorly mixed zone. As an example of what might be accomplished with such a reactor, feed containing 50% $C_3$ and $C_4$ olefins could be introduced to the well mixed zone. If 60% of the olefins in this feed were polymerized in the well-mixed zone the composition in that zone would be about 22% olefin, 20 vol. % dimer and the remainder paraffins or inert. The composition of the feed leaving the well-mixed zone and entering the poorly mixed zone would be this same composition. If 85% of this remaining olefin were converted in the poorly mixed zone the composition of the effluent would be about 3.6% olefin, about 36% dimer and the remaining paraffin or inert. The overall conversion therefore would be about 94% of the entering olefin. In this way a substantial olefin concentration is maintained for good reaction rate in the well-mixed slurry zone and at the same time a high overall conversion is attained by removing most of the remaining olefin in the poorly mixed zone leaving the reactor. The heat from this latter zone can still be utilized for preheating the feed as a result of its submersion in the bed of the slurry reactor.

With catalyst of about 20 mesh and finer size, velocities of approximately 1 to 5 ft./min. will produce good fluidization. With such velocities a definite bed depth could be maintained if the proper amount of catalyst were charged. Such a slurry system can be utilized to provide continuous catalyst addition and removal. In this case the fresh catalyst might be introduced into the top of the poorly mixed zone so that the lowest concentration of olefins would have the highest activity catalyst to react with, although introducing the fresh catalyst directly into the well mixed zone would still be quite satisfactory. Similarly a spent catalyst would be withdrawn by withdrawing a portion of the catalyst in the well-mixed bed. In this fashion the plant would run continuously with no shutting down for catalyst renewal.

Referring now to Fig. 1, liquid olefins to be polymerized are introduced by line 1 and passed into reaction zone 4. Temperatures are maintained at about 450° F. and the pressure at 100 lbs./sq. in. gage. The reactants pass upwardly through the catalyst in reactor 4 at such a linear velocity that the catalyst is maintained in suspension with a level at 6. A stirrer 5 is also provided to give additional agitation if desired.

Immersed in the slurried catalyst are relatively narrow diameter tubes 7 and 8 connected by manifold 9 and open at the bottom. Tubes 7 and 8 are filled with the same catalyst as in the larger zone from fresh catalyst inlets 10 and 11. Liquid polymer products from the large zone pass into zones 7 and 8 together with catalyst. By controlling the rate of flow into zones 7 and 8 catalyst will flow down into and out of these zones as slurried catalyst and liquid polymers are introduced into them. In case catalyst concentration and slurry density decrease to such an extent that catalyst leaves tubes 7 and 8 with the liquid product, a cyclone separator 12 is provided in exit line 13 to separate out this catalyst which is returned by line 14. Liquid product is withdrawn through line 15. Spent catalyst is withdrawn through line 2.

Figure 2:
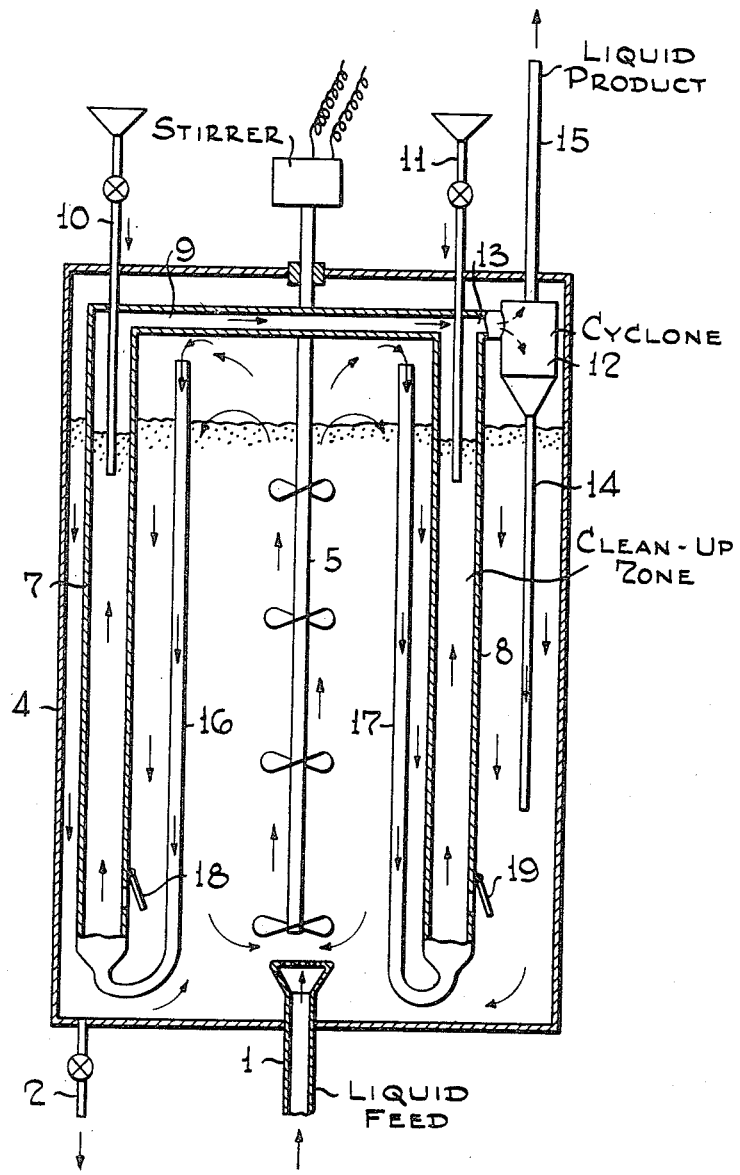
Fig. 2 illustrates another embodiment of the invention similar to Fig. 1 in which the catalyst is separated from the effluent from the well-mixed zone before it passes to the poorly-mixed zone.

In Fig. 2 is shown a second embodiment of the invention in which the same reactor is provided with a well mixed enlarged zone 4, having small diameter tubes 7 and 8 immersed therein as in Fig. 1. However, in this embodiment the tubes 7 and 8 are not open at the bottom but instead are provided with very small diameter extensions 16 and 17 which connect the bottom of tubes 7 and 8 with the space above the level 6 of the catalyst slurry. Thus the liquid in the reactor is substantially separated from the catalyst before it is introduced into tubes 7 and 8. Tubes 7 and 8 are also provided with flap valves 18 and 19 to release any excess catalyst which may collect in these tubes. Conditions in this reactor are the same as in Fig. 1.

The above description illustrates an apparatus which eliminates any need for heat exchange surfaces in the poorly mixed zone. Most of the polymerization occurs in the well-mixed zone in which the catalyst is maintained in a slurry which is well mixed and well circulated by mechanical stirring or other agitation. The effluent from the well-mixed zone passes upward through a zone of small diameter having poor top-to-bottom mixing and which is completely immersed in the well mixed zone and is completely cooled by heat exchange therewith.

The nature and objects of the present invention having been thus described and illustrated, what is claimed as new and useful and desired to be secured by Letters Patent is:

1. A process for polymerizing olefins which comprises maintaining an agitated slurry of finely divided solid polymerization catalyst and olefin in a first reaction zone wherein substantial olefin polymerization occurs, maintaining a solid polymerization catalyst in at least one second relatively unagitated reaction zone, said second zone being at least partially submerged in and in heat transfer relationship with said slurry, passing effluent including polymer and unreacted olefins from said first into said second zone, polymerizing olefins in said second zone, and withdrawing product including polymer from said second zone.

2. A process as in claim 1 wherein catalyst in said secondary zone is in the form of a stationary bed.

3. A process as in claim 1 wherein catalyst in said secondary zone is slurried in hydrocarbon comprising polymer.

4. A two-stage process for polymerizing olefins which comprises the steps of maintaining a slurry of finely divided, solid polymerization catalyst in a hydrocarbon phase comprising olefins in both a primary and at least one secondary reaction zone, said secondary zone being substantially completely submerged in slurry in said first zone whereby heat transfer between said zones is obtained, agitating the slurry in said primary zone under conditions whereby a portion of the olefins are polymerized and whereby the concentration of unreacted olefins throughout said agitated slurry is substantially constant, passing effluent comprising unreacted olefins and polymer from said first to said secondary zone, polymerizing olefins in said secondary zone while maintaining slurry therein in a relatively quiescent state whereby an olefin concentration gradient exists between the inlet and outlet thereof, and withdrawing product comprising polymer from said secondary zone.

5. A process as in claim 4 wherein said effluent passed to said secondary zone is withdrawn from said primary zone slurry.

6. A process as in claim 4 wherein said effluent passed to said secondary zone is substantially free of catalyst.

7. A process as in claim 4 wherein fresh catalyst is charged to said secondary reaction zone.

References Cited in the file of this patent

UNITED STATES PATENTS

| Number | Name | Date |
| --- | --- | --- |
| 2,179,829 | Pier | Nov. 14, 1939 |
| 2,419,088 | Putney | Apr. 15, 1947 |
| 2,419,097 | Stratford et al. | Apr. 15, 1947 |
| 2,425,969 | Utterback | Aug. 19, 1947 |
| 2,432,298 | Eastwood et al. | Dec. 9, 1947 |
| 2,450,547 | Gaylor | Oct. 5, 1948 |
| 2,501,695 | Sensel et al. | Mar. 28, 1950 |
| 2,515,156 | Jahnig et al. | July 11, 1950 |